Sept. 23, 1941. T. L. DUFFY 2,256,862
AMUSEMENT DEVICE
Filed Dec. 15, 1936 7 Sheets-Sheet 3

Inventor
THOMAS L. DUFFY
By Semmes & Semmes
Attorneys

Sept. 23, 1941.   T. L. DUFFY   2,256,862
AMUSEMENT DEVICE
Filed Dec. 15, 1936   7 Sheets-Sheet 4

Inventor
THOMAS L. DUFFY
By Semmes & Semmes
Attorney

Sept. 23, 1941.  T. L. DUFFY  2,256,862
AMUSEMENT DEVICE
Filed Dec. 15, 1936  7 Sheets-Sheet 7

Inventor
THOMAS L. DUFFY
By Semmes & Semmes
Attorneys

Patented Sept. 23, 1941

2,256,862

UNITED STATES PATENT OFFICE 2,256,862

AMUSEMENT DEVICE

Thomas L. Duffy, Harrison, N. J.

Application December 15, 1936, Serial No. 116,011

12 Claims. (Cl. 104—129)

This invention relates to an amusement device, and more particularly has reference to an electrically operated amusement device.

One of the objects of my invention is to provide an amusement device which is highly entertaining to adults as well as children.

Another object of my invention is to provide an amusement device consisting of a track having a train running thereon, and also having a bridge located on the track which is operable by means of an electromagnetic relay actuated by the train.

Another object of my invention is to provide an amusement device consisting of a track having a train adapted to run thereon, said track also having a lift bridge located thereon, and a second track having a boat adapted to run on it, and so arranged with respect to the first track that it passes under the bridge.

Another object of my invention is to provide an electrically operated amusement device which will perform a series of independent functions by actuating a single switch.

Still another object of my invention is to provide an electrically operated amusement device which will perform a series of independent functions either manually or automatically.

Yet another object of my invention is to provide an electrical toy train system in which a bridge is provided in the system and such bridge being adapted to be raised by means actuated by the train in running on the track.

A still further object of my invention is to provide an electrically operated amusement system consisting in a plurality of tracks having a vehicle running on each track and a control unit for actuating the functions of the system.

Yet another object of my invention is to provide an electrical train system which can be operated without any danger of accidents, etc.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect without limiting the improvements in their useful applications to the particular constructions, which, for the purpose of explanation, have been made the subject of illustration.

In the drawings:

Figure 24 is a diagram showing the system of operation of my device;

In terms of broad inclusion, my invention consists in two independent sections of track, on one of which a train is adapted to run; a boat being adapted to run on the other section of track. A lift bridge is provided on the train track, and the boat track is so arranged with respect to the train track as to pass under the bridge.

By starting the train in motion on its track, and by having a green light at the approach side of the bridge, the train will continue to run until it is desired to operate the bridge and boat.

A push button on a control unit is depressed and a cycle of operation commences. A red signal light appears with the green light at the bridge approach, and the train continues to move, passing over a special section of track. When the train passes over the special section of track, it closes an electric circuit to a bridge raising relay. The bridge being in motion causes the green light to disappear, and the train comes to a stop at the red signal light.

At this point the boat motor becomes energized and begins to move on its track, approaching the bridge. When the bridge completes its ascent, the bridge signal lights change from red to green and the boat proceeds under the bridge. When the boat is clear of the bridge, it passes over a special section of track and closes the electric circuit to the bridge-lowering relays, allowing the bridge to descend, its signal light changing back to red. The boat continues to run until it arrives at a dead section in the track and comes to a stop. The bridge continues to descend until it arrives at its lowermost position, at which position the train signal changes to green. The train then commences to run on its track, and will continue to run until the push button is again depressed to repeat the foregoing cycle.

The relays and switches are so arranged as to make the system "crash-proof," that is, the boat could not collide with the partially opened bridge, nor could the bridge operate beyond its highest limit, nor could the train operate through the opened bridge.

Figures 1, 27:
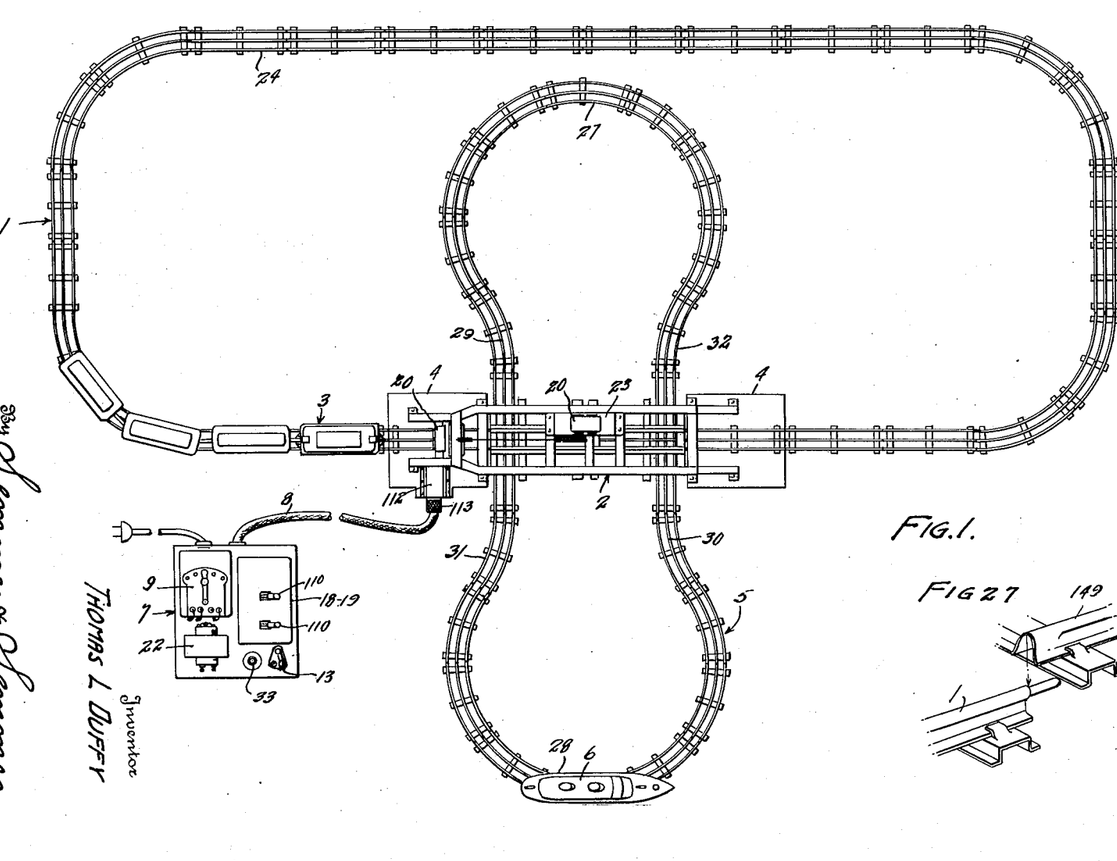
Figure 1 is a plan view of my invention.
Figure 27 is a detail view in perspective of a portion of the track.
Figures 2, 4:
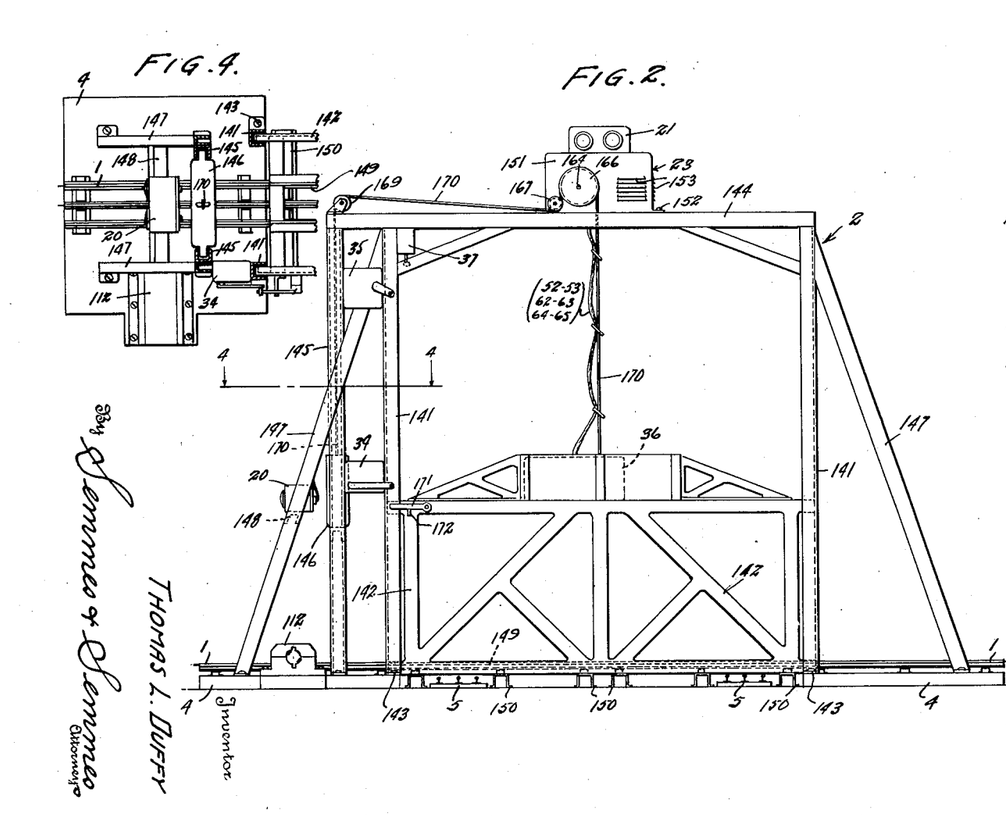
Figure 2 is a side elevation of the lift bridge.
Figure 4 is a view taken along the line 4—4 of Figure 2.

Referring to the drawings, and more particularly to Fig. 1, I have shown a train track 1. Positioned on one of the straight sides of the track is a lift bridge designated generally 2, over which a toy train 3 is adapted to pass. As shown in Fig. 2, the bridge is mounted on supporting elements 4.

Another section of track 5 is so arranged with respect to the track 1 that a portion thereof passes under the lift bridge 2. A boat 6, which is geared at a low speed, is adapted to run on the track 5 and pass under the bridge 2 when it is in its raised position, as will be more apparent hereinafter.

While I prefer to employ a toy train 3 and a wheeled boat 6 to run on the tracks 1 and 5, respectively, it is of course within the scope of my invention to use any type of toy vehicle in lieu of those disclosed. In connection with the boat track 5, effects may be used to simulate water, and thus make the arrangement more realistic. The tracks 1 and 5 are the conventional type of track, having certain insulated or dead sections, as will be later described in the specification.

The operation of the system is controlled by a single control unit 7 which is connected to a suitable source of electric energy. A multiple cable 8 carries all of the necessary wiring for the operation of the system.

The operation of my system is best shown by reference to the diagram shown in Figure 24. A transformer 9 supplies current to the train track 1 and the boat track 5 through lines 10 and 11, respectively. The lines 10 and 11 are connected to the center and running rails of each track.

A line 12, in which is positioned a manually operated switch 13, supplies current as a common lead to the operating solenoids 14 and 15, 16 and 17, of the relays 18 and 19, respectively.

The transformer 9 also supplies current to red and green train signal lights 20, and to red and green boat signal lights 21.

A second transformer 22 supplies current for the operation of a bridge motor 23. While I have shown separate transformers for the train and boat and for the bridge, a single transformer of sufficient output may be used to supply current for all the circuits.

The train track 1 is provided with an insulated section 24 in one of its running rails at a point somewhat remote from the bridge 2. There is also an insulated section 25 in the center rail and an insulated section 26 in the running rail at the approach side of the bridge 2.

The boat track 5 has two insulated sections 27 and 28 in its running rails. These sections serve as docking points for the boat. The center rail is provided with insulated sections 29 and 30 at the approach sides of the bridge 2, while insulated sections 31 and 32 are provided in the running rail on the far sides of the bridge.

Control switches 33, 34, 35, 36 and 37, the functions of which will be described in their order of operation, are interposed in the system.

In the event manual operation of the relays 18 and 19 is desired, the switch 13 is left open. For automatic operation, however, switch 13 is closed and current for the operation of the relays is allowed to pass through the common lead 12 to one end of the solenoid windings 14, 15, 16 and 17.

Consider the relays 18 and 19 in the positions shown in Figure 24, and the train traveling on the track 1 in the direction indicated by the arrows. The push button 33 is momentarily depressed and the solenoid 15 is energized by completing the circuit through push button 33 and a line 38. When solenoid 15 is energized, it closes contacts 18—a and 18—b. The contact 18—a prepares the solenoid 17 for operation, while contact 18—b completes the circuit to the red train lights 20—R through lines 11, 39, 40, contact 18—b, line 41, and line 42.

When the train reaches the insulated section 24, the circuit is completed to the solenoid 17 through line 12, line 43, contact 18—a, line 44, the insulated section 24, the train structure, the running rail of the track, and through line 11 to the transformer 9.

When solenoid 17 is energized it opens contacts 19—a, 19—b and 19—c, and closes the contacts 19—d, 19—e and 19—f of the relay 19.

When the above-mentioned action takes place, current is supplied from the transformer 22 to the bridge operating motor 23, through line 45, the field coil 23—a, line 46, contact 19—e, line 47, armature 23—b, line 48, line 49, contact 19—f, line 50, contact 35—a of the switch 35, and line 51, back to the transformer 22.

The bridge starts to rise, breaking the contact 36—a, and closing contacts 36—b and 36—c of the switch 36, momentarily closing switch 34. The closing of switch 34 energizes the solenoid 14 through a line 34' which again opens the contacts 18—a and 18—b.

As the contact 36—b is closed, the train red light 20—R remains on the circuit now being completed through lines 52 and 53 and contact 36—b. The train proceeds toward the bridge until it reaches dead section 25, where it stops. At this point current is transmitted through the train wheels to the insulated section 26 and then through line 54, contact 19—d and line 55 to the boat docking sections 27 and 28. The boat being on one of these dead sections starts to move toward the bridge. In the event, however, that the bridge does not rise properly, the boat again comes to a stop on one of the dead sections 29 or 30, depending upon whether the boat comes from the dock 27 or 28.

When the bridge has risen to its limits, it operates switch 35, opening contact 35—a and closing contact 35—b, and operates sliding switch 37 to change the boat light 21 from red to green. The opening of contact 35—a breaks the circuit to the motor 23 and causes it to stop. The closing of contact 35—b passes current to dead sections 29 and 30 of the boat track through lines 56 and 57. This allows the boat to continue its course under the bridge and to the other docking point 27 or 28.

As the boat passes over one of the insulated sections 31 or 32, current is transmitted through the boat structure to a line 58, to energize solenoid 16 which closes contacts 19—a, 19—b and 19—c and opens contacts 19—d, 19—e and 19—f. The bridge motor 23 now reverses as the current is supplied to it through line 45, field 23—a, line 59, contact 19—b, line 46, armature 23—b, line 47, line 61, contact 19—c, line 62, contact 36—c and lines 63 and 51 to the transformer 22.

When the bridge starts to lower, the switch 35 returns to its normal position and switch 37 functions to change the boat signal light 21 to red. After the bridge completes its lowering operation, the switch 36 automatically functions to again open contacts 36—b and 36—c and close contact 36—a. The contact 36—c breaks circuit to motor 23 and causes it to stop. The contact 36—b breaks circuit to red light 20—R. The current is now supplied to the green light 20—G and dead section 25 through line 10, line 42, contact 19—a, line 64, contact 36—a, line 65 and line 65'. This permits the train to proceed along the track 1 until the push button 33 is again operated to repeat the foregoing cycle.

Figures 25, 26:
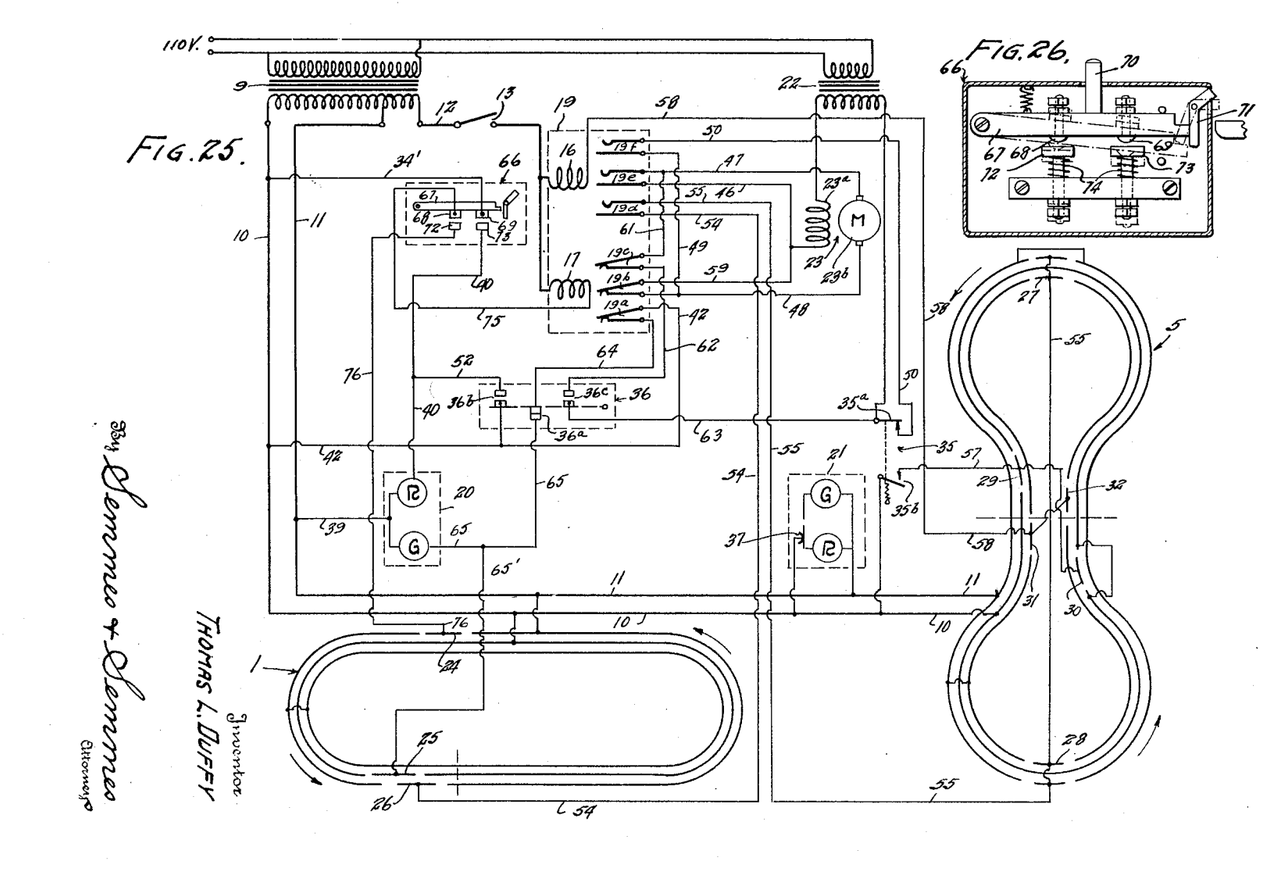
Figure 25 is a diagram showing a modification of my system.
Figure 26 is a detail view showing a switch employed in the circuit shown in Figure 25.
Figure 29:
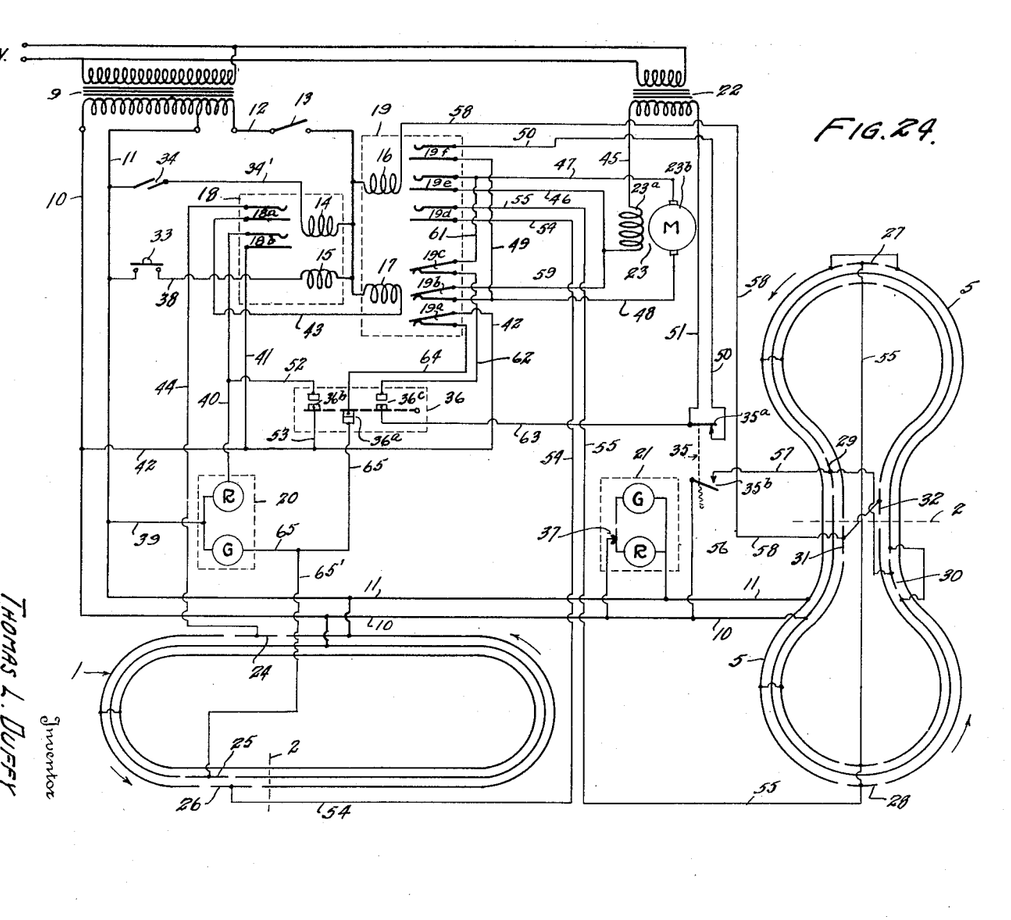

In Figure 25 there is shown a modified circuit in which the relay 18, push button 33, and switch 34 are supplanted by a single switch unit 66. The details of the switch 66 are shown in Figure 26.

To start the operating cycle, the pivoted contact arm 67 which carries the contact points 68 and 69 is manually depressed by means of the button 70. The contact arm 67 is maintained in the depressed position by means of pivoted latch lever 71. In its depressed position points 68 and 69 are in contact with contacts 72 and 73, respectively. These contacts are yieldingly held in good electrical contact with points 68 and 69 by means of helical springs 74.

The contact points 68 and 72 function similarly to contact 18—a (Fig. 24) closing the circuit to the solenoid 17 through lines 75 and 76. The contacts 69 and 73 function similarly to contact 18—b (Fig. 24) to close the circuit to the red train light 20—R. Contact arm 67 remains in this closed position until an arm on the bridge trips the latch 71, allowing the switch to return to its normal open position by action of a spring 78. Thus it will be seen that the result of the operation of this switch 66 is similar to that obtained by actuation of the switches 33 and 34 and the relay 18.

Should manual operation of the system be desired in lieu of automatic operation, the switch 13 is moved to its open position. Suitable levers are provided in conjunction with the relays 18 and 19 to move these relays and hence cause the several operating units of the system to function.

Figure 14:
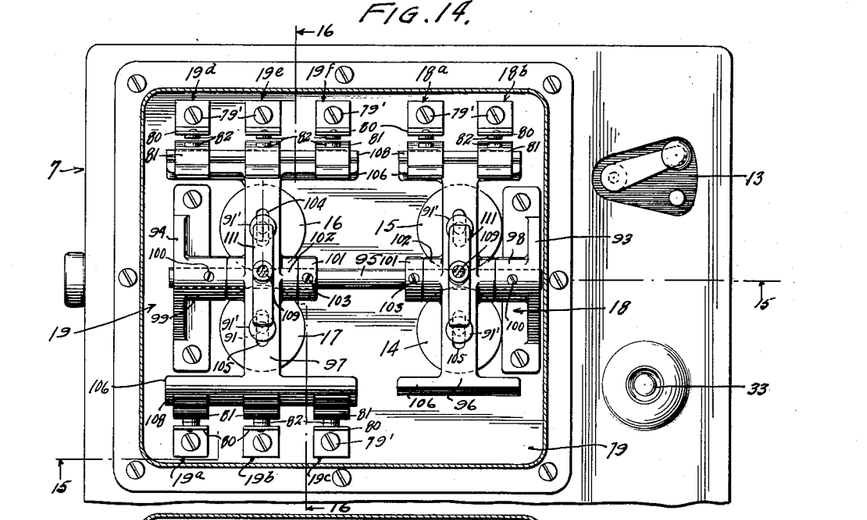
Figure 14 is a top plan view showing the relays.
Figure 15:
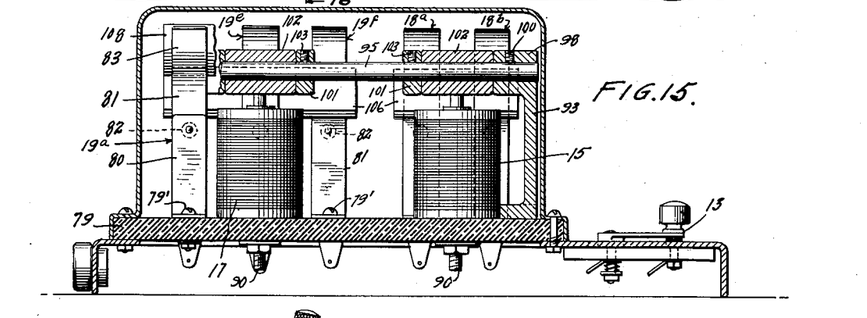
Figure 15 is a view taken along the line 15—15 of Figure 14.

As heretofore pointed out, the operation of the bridge 2 is controlled by relays 18 and 19. The structural details of these relays are best shown in Figures 14 to 16, inclusive.

The spring contacts designated generally 18—a and 18—b are secured to base 79 of insulating material by means of screws 79'. The screws 79' also serve as connectors for the various leads to the contacts.

The contacts 19—a, 19—b, 19—c, 19—d, 19—e and 19—f of relay 19 are similarly secured to the base. Inasmuch as the contacts are of similar construction, I shall limit by description to a single contact for the purpose of simplicity.

Figure 16:
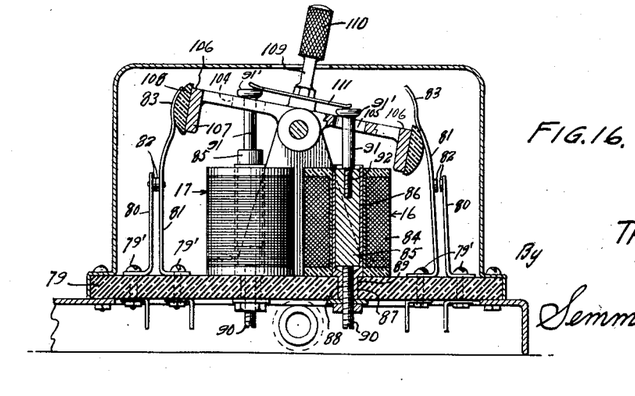
Figure 16 is a view taken along the line 16—16 of Figure 14.

Referring now specifically to Fig. 16, the contacts 19—a, 19—b, 19—c and 19—d, 19—e, 19—f of relay 19 are shown in the closed and open positions, respectively. Each contact comprises a pair of upright resilient members 80 and 81. A contact point 82 is carried by each of the upright members. The upright 81 is of greater length than the member 80 and is provided with an arcuate portion 83 adjacent its upper end.

As pointed out, the contacts of the relay 18 are actuated by the solenoids 14 and 15 and the contacts of relay 19 by solenoids 16 and 17. Each of these solenoids is of identical construction, and by referring to Figure 16 the solenoid 16 is clearly shown in cross section. The solenoid is provided with an electromagnetic coil 84 wound on a non-magnetic sleeve 86, and a moving core 85 is slidably mounted in this sleeve.

The sleeve 86 is provided with a reduced extension 87 having an internally threaded bore 88. The extension 87 extends through an aperture 89 in the base. A bolt 90 provided with a lock nut is screwed into the bore 88 and is used as a limit stop for core 85.

A pin 91, having a head 91', the function of which will be more fully described, is secured in each of the cores 85, at 92.

Secured to the base 79 are a pair of upright standards 93 and 94. A shaft 95, for pivotally mounting rocker arms 96 and 97 of the relays 18 and 19, respectively, is journaled in the enlarged upper portions 98 and 99 of the standards, being secured therein by set screws 100.

Collars 101 are fitted onto the shaft 95 adjacent the rocker arm bearings 102 and are secured thereto by the screws 103. These collars prevent lateral displacement of the rocker arms.

Each of the arms 96 and 97 is provided with a pair of elongated apertures 104 and 105 through which extend the pins 91, the heads 91' of which co-act with the arms 96 and 97 to rock them when the solenoids become energized.

As best shown in Figure 16, each end of the arm 97 is provided with a T-shaped portion 106 having a depending flange 107. Suitably secured to the flange 107 is a cam member 108 of insulating material. The cam 108 is adapted to fit into the arcuate portion 83 to hold the contacts closed.

It will of course be appreciated that the arm 97 will respond with a rocking motion to the pull of the plungers 85 in each of the solenoids as the coils are energized. This action likewise applies to the arm 96 when the solenoids 14 and 15 are energized. It is of course apparent that each of the solenoid magnet coils performs their necessary functions by being energized only momentarily.

As shown in Figure 16, the coil 16 has been energized and the contacts 19—a, 19—b and 19—c are closed and the contacts 19—d, 19—e and 19—f are open. Obviously, when the solenoid 17 is energized, the inverse is true.

The relays are so designed that one set of contacts will not close until the opposite set opens, thus permitting the contacts to function without the danger of short-circuiting the transformers.

A manual operating lever 109 having a knurled head 110 is suitably secured to the bearings 102 of each of the arms 96 and 97. A metallic strip 111 is held in position above the heads of the pins 91 by the member 109 and prevents the removal of the plungers 85. The levers 109 provide means for manual actuation of the relays.

The above described parts, that is, the relays 18 and 19, and the switches 13 and 33, form a controller for the system, and as shown may be included in a single unit. This unit may be suitably encased, and by means of the flexible cable 8 may be positioned to conveniently operate the system.

Figures 17, 18:
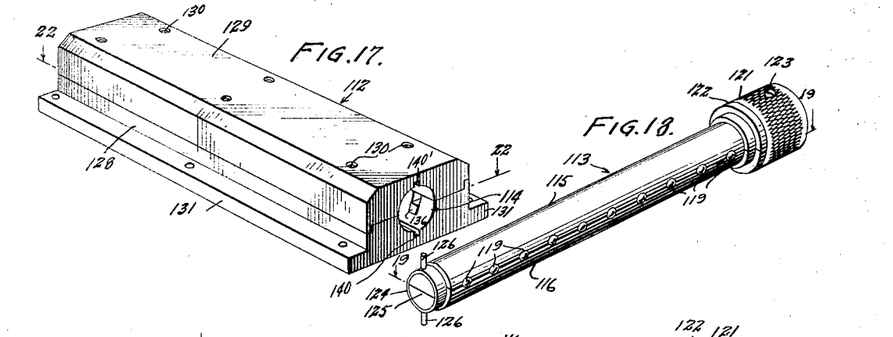
Figure 17 is a perspective view of the receptacle for the plug-in device carrying the operating wires.
Figure 18 is a perspective view of the plug-in device.
Figure 19:
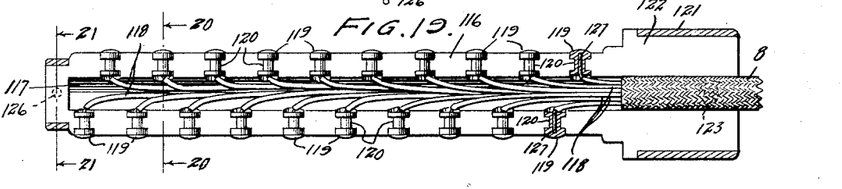
Figure 19 is a view taken along the lines 19—19 of Figure 18.

Secured to the bridge supporting member 4 is a receptacle 112 of insulating material. A plug-in member or jack 113 is adapted to be inserted into an aperture 114 formed in receptacle 112. The plug is likewise formed of insulating material and receives all of the lead wires from the control unit 7 which may be carried therefrom in the flexible cable 8. The receptacle 112 carries the lead wires for the various operating units of the system.

Figures 20, 21, 22:
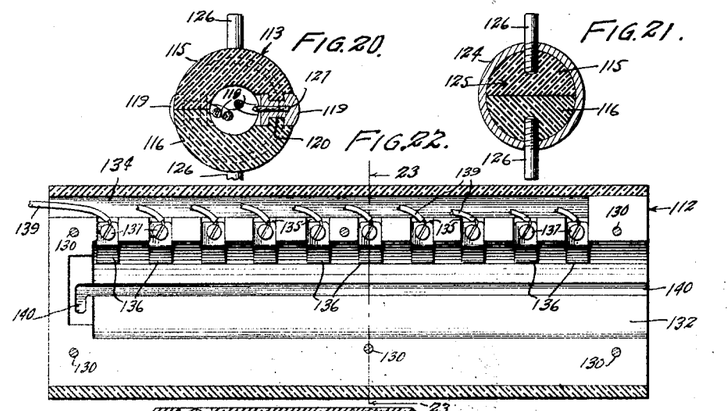
Figure 20 is a view taken along the line 20—20 of Figure 19.
Figure 21 is a view taken along the line 21—21 of Figure 19.
Figure 22 is a view taken along the line 22—22 of Figure 17.

As best shown in Figures 18 to 21, the jack 113 is formed of two semi-cylindrical members 115 and 116 which join to form a cylinder. Each of the members is cut away to form a central bore 117. The bore 117 is adapted to carry the lead wires 118. As shown in Figure 20, metallic contact points 119 are fitted into recesses 120 provided in the members 115 and 116. In order to hold the members 115 and 116 in proper position and to provide means for conveniently inserting and removing the jack 113, a knurled sleeve 121 is fitted on an enlarged end 122. A set screw 123 secures the sleeve in place.

A metallic collar 124 is fitted around the reduced end 125 of the plug. A pair of pins 126 are screwed into the members 115 and 116, and are arranged at substantially right angles to the contacts 119. The wires 118 are secured to the contacts as at 127.

The receptacle 112 is composed of a lower or base member 128 and a top closure member 129 adapted to be held together by suitable means, such as screws or bolts 130. The base is flanged at 131 so as to provide means whereby it can be secured to the support 4.

Figure 23:
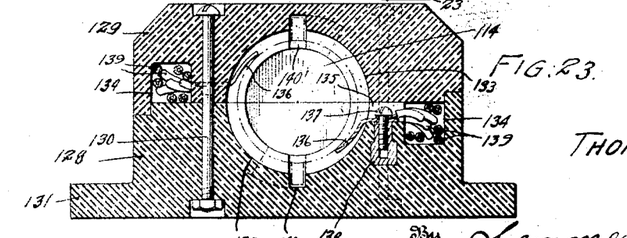
Figure 23 is a view taken along the line 23—23 of Figure 22.

Referring to Figures 22 and 23, it can be seen that the base 128 and the top 129 are recessed as at 132 and 133, respectively, to form the bore 114 into which the jack is inserted. The base member 128 and the cover member 129 are also provided with channels 134 adjacent and parallel with the bore 114, and communicate with it by a series of spaced transverse slots 135. These slots 135 are so positioned as to be opposite the contacts 119 when the plug is inserted in the bore 114. In each of the slots 135 is mounted a contact strip 136 held in place by a screw 137. The screws 137 are threaded into sleeves 138 which are molded, or otherwise embedded, into receptacle 112. These screws also serve as connection means for lead wires 139 which are carried in the channels 134 and thence to the several operating units of the system. The resilient contact strips 136 project into and partially around the circumference of the bore 114 to co-act with contact points 119 to complete the electrical circuits.

The members 128 and 129 are provided with bayonet slots 140 and 140', respectively, into which the pins 126 fit. When the plug 113 is completely inserted into the receptacle, the pins 126 will fit in these bayonet slots, and by turning the plug 113 it will be locked in position.

With a jack arrangement such as just described, the lead wires for operation of the system may be permanently attached to the several operating units. Should it be desired to dismantle for any purpose, such as moving or storage, the only operation necessary to disconnect the electrical circuit will be to remove the jack 113 from its receptacle 112.

For the sake of clarity in the drawings, no attempt has been made to show the lead wires to the various units. These lead wires, however, may be run from the receptacle 112 and through the bridge and track structure in any convenient manner well known to those versed in that art.

Figure 3:
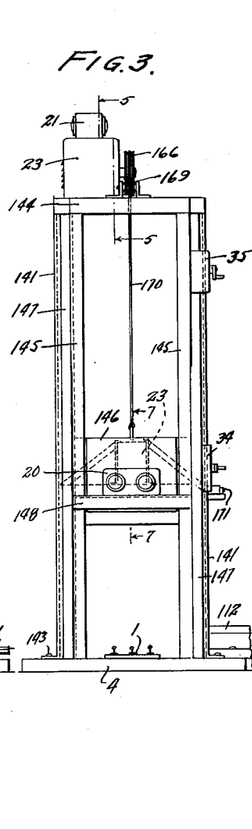
Figure 3 is an end elevation of the lift bridge.

As heretofore pointed out, the train track is provided with a lift bridge 2. This bridge is best shown in Figures 2 to 4.

The superstructure of the bridge consists of a plurality of upright channels 141 which form guides for the movable portion 142 of the bridge. The uprights are secured to the supports 4 at 143. Horizontal beams 144 are secured to the upper ends of the uprights 141. The beams 144 serve to support the bridge motor 23 and the train lights 21.

Another set of upright channels 145 arranged in parallel relationship to the channels 141 are secured to the support 4 at one end of the bridge. These channels serve as guides for a counterweight 146 which will later be described. The switch members 34 and 35 are also carried by the upright channels.

Angularly arranged brace members 147 are secured to the uprights 141 and the base for supporting the superstructure. The train signal lights 20 are positioned on a cross bracket 148 which is carried by the supports 147.

The movable portion 142 of the bridge carries a section of train track 149 which is adapted to fit in with the remainder of the track when the bridge is in its lowermost or normal position. The method of joining the track section 149 with the rest of the track is clearly shown in Figure 27, where the end of the rails 149 are split to fit over the connecting pins in the adjoining rails 1.

Spacer members 150 are also secured to the bottom of the movable bridge portion 142 so as to keep the track 149 clear of the boat track, and obviate any danger of short-circuiting the tracks.

Figures 5, 6, 9, 10, 11:
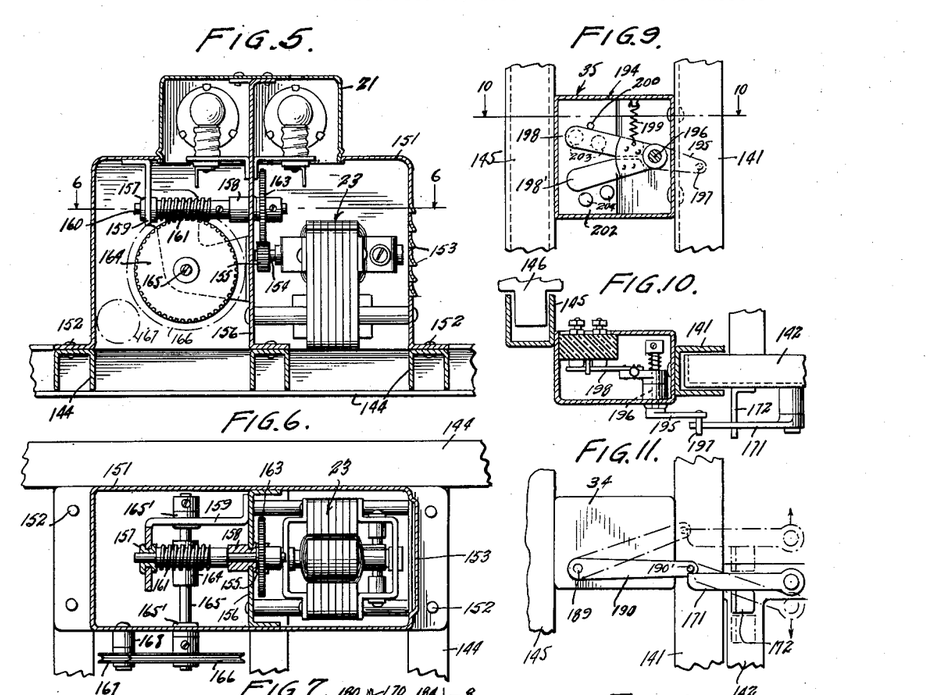
Figure 5 is a view taken along the line 5—5 of Figure 3.
Figure 6 is a view taken along the line 6—6 of Figure 5.
Figure 9 is a section of one of the switches.
Figure 10 is a view taken along the line 10—10 of Figure 9.
Figure 11 is a detail view of another one of the switches.

The casing 151 of the motor 23 for raising and lowering the bridge portion 142 is secured to the horizontal support as at 152. Louvres 153 are provided in the casing for ventilating the motor.

The motor 23 is of the conventional series wound type, and its armature shaft 154 carries a pinion 155. A partition wall 156 is provided in the casing.

Journaled in the bearings 157 and 158 carried by a bracket 159 and the partition 156, is a shaft 160 having a worm 161. The shaft extends through the partition, and a gear 163 is secured to its end, which gear meshes with the pinion 155. The warm 161 meshes with a worm wheel 164 carried by a shaft 165 which is suitably journaled in the casing, as indicated at 165'.

A driving sheave 166 is carried by the shaft at its outer end. A small idler pulley 167 is journaled in the casing at 168. A second pulley 169 is provided on the bridge superstructure above the counterweight 146. A hoisting cable 170 is secured to the counterweight 146 and passes over the idler 169, under the pulley 167 and over the sheave 166 and thence to the switch 36 where it is attached to the operating arm of this switch.

Figures 7, 8, 12, 13:
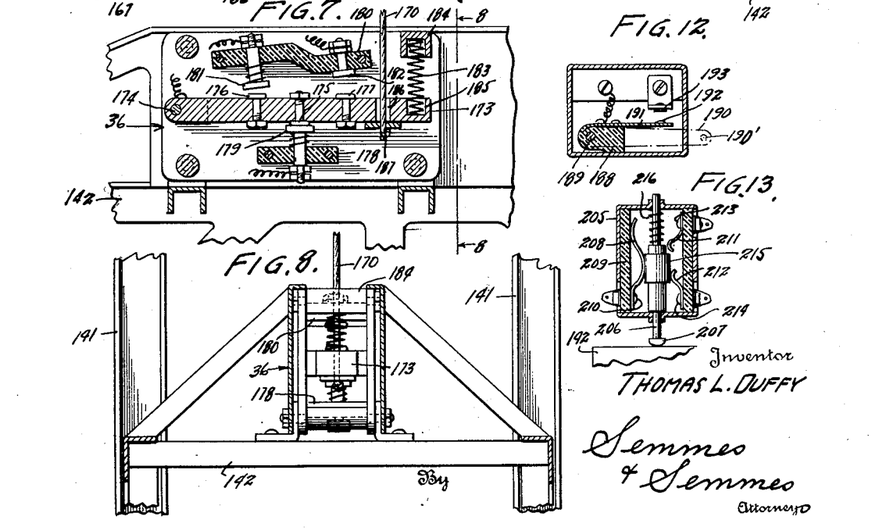
Figure 7 is a view taken along the line 7—7 of Figure 3.
Figure 8 is a view taken along the line 8—8 of Figure 7.
Figure 12 is a top sectional view of the switch shown in Figure 11.
Figure 13 is a sectional view of another switch.

The switch unit 36 is best shown in Figure 7. This switch structure is carried on the top of the movable bridge portion 142. An arm 173, pivotally mounted at 174, carries contact points 175, 176 and 177. Mounted immediately beneath the arm 173 is a block of insulating material 178 which carries a resiliently mounted contact point 179 adapted to cooperate with the point 175 to constitute contact 36—a. Mounted above the arm 173 is another insulating block 180 which carries the contact points 181 and 182 which cooperate with the contact points 176 and 177 to form contacts 36—b and 36—c. A helical spring 183, having one end seated in a cup 184 and the other end seated in a recess 185 in the arm 173, tends to normally hold contacts 36—b and 36—c in open position. The contact point 181 is resiliently mounted for correctly timing the make and break functions of the switch.

The hoist rope 170 extends through an aperture 186 in the lever arm and is secured thereto as shown at 187.

As the bridge 142 starts to rise when current is supplied to the bridge motor 23, the contact 36—a is opened and contacts 36—b and 36—c are closed. The movable bridge 142 carries a pivoted arm 171 which is normally held in a horizontal position by a stop lug 172 which is also secured to the bridge. The arm 171 is adapted to actuate the switches 34 and 35, as will become apparent.

While I have shown the switch 36 as being mounted on the movable bridge portion 142, it will of course be readily appreciated that it may be positioned elsewhere. For example, the switch may be mounted on the horizontal beams 144 of the superstructure. Obviously, this arrangement would make it unnecessary to use a flexible conductor cable to the bridge.

As shown in Figures 11 and 12, the switch 34 comprises a casing having a switch arm 188 of insulating material which is pivotally mounted therein by means of a shaft 189 which extends outside the casing. The outer end of the shaft 189 carries an arm 190 which is provided with a pin 190' adapted to be moved by the lever arm 171 carried by the bridge 142. The insulating arm 188 carries a resilient metallic member 191 which is provided with a contact point 192. Contact point 192 is adapted to contact with the point 193 mounted in the casing. It will of course be appreciated that the contact points 192 and 193 will be closed and then opened as the arm 171 rides over the pin 190', as indicated by dot and dash lines in Figure 11. The pivoted construction of the arm 171 also permits this arm to pass the pin 190' on its down movement without disturbing the switch 34.

When the bridge has risen to its limit, it operates the switch 35 to break the circuit to the bridge raising motor 23 and stop its movement, and will also operate the sliding switch 37 to change the boat signal light 21 from red to green. The switch 35 is best shown in Figures 9 and 10, where it can be seen enclosed in the casing 194 which is supported between the channels 141 and 145 of the bridge superstructure. An arm 195, which is mounted on a shaft 196, carries a pin 197 which is adapted to be engaged by the arm 171 on the bridge. The shaft 196 also carries switch arms 198 and 198' within the casing. In the event that a single transformer is employed, the contact points 203 and 204 could be wired with respect to each other so that a single switch arm may be used. A spring 199 is secured at one of its ends to the top of the casing and at its opposite end to the arm 198 to normally hold the contacts in the position shown in Figure 9 against a stop pin 200.

Suitably mounted on an insulating block 202 are two pairs of fixed contact points 203 and 204, which are adapted to be engaged by switch arm 198. The contact points 203 being connected by switch arm 198 form contact 35—a, while contact points 204 co-acting with arm 198 form contact 35—b. The closing of the contact 35—b, or in other words connecting points 204 will pass current to the dead sections 29 and 30 of the boat track 5 through the lines 56 and 57 which will permit the boat to continue its course under the bridge and to the other docking point 27 or 28, as the case may be.

After the boat has passed under the bridge and the bridge starts to lower, the switch 35 will return to its normal position, disconnecting points 204 and connecting points 203. The switch 37 will also function to change the boat signal light 21 from green to red.

The sliding switch 37 is best shown in Figure 13. The switch casing 205 is suitably secured to the upper part of the superstructure. The switch consists of a plunger 206 which is provided with a head 207, which is adapted to be engaged by the upper portion of the movable bridge 142. A resilient contact 208 is secured to the insulated wall 209 of the casing, as at 210.

Contacts 211 and 212 are secured to the opposite insulated wall of the casing at 213 and 214. These contacts are connected to the green and red boat lights, respectively. Plunger 206 carries a metallic conductor 215 which is adapted to complete the circuit from the contact 208 to either of the contacts 211 or 212. A helical spring 216 is fitted around the upper end of the plunger for normally holding the switch in the position shown in Figure 13, that is, to complete the circuit to the red signal light for the boat.

It is believed that the use of the above-mentioned switches will overcome any danger of the bridge not properly functioning. These switches will control the signal lights 20 and 21 for the train and boat, and always assure that the proper signal will be on.

From the foregoing description it will be readily appreciated that I have provided a toy train system which performs a plurality of functions and yet which can be used with a conventional train set without greatly increasing the cost thereof. Moreover, the system is crash-proof, and there is little danger of short-circuiting the tracks due to the manner in which they are supported and insulated.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In an electrically operated amusement device, a source of electrical current, a track, a dead section in said track, a motor-driven vehicle adapted to run on said track, a lift bridge in said track, an electric motor for raising and lowering said bridge, a second track so arranged with respect to said first track as to pass under said bridge, a dead section in said second track, a second motor-driven vehicle adapted to run on said second track, means operable by said first vehicle when it arrives on said dead section to supply current to said motor to raise said bridge, a reversing switch having one position for connecting said source of current in series with the electric motor for raising the lift bridge and in series with an upward limit switch for limiting upward movement of the lift bridge, a relay for moving the reversing switch to bridge-raising position, said relay being connected in series through the dead section in the first mentioned track with the source of current when the vehicle is on said dead section, said reversing switch having a second position for connecting said source of current in series with the electric motor for lowering the lift bridge and in series with a downward limit switch for limiting downward movement of the lift bridge, a second relay for moving the reversing switch to bridge-lowering position, said second relay being connected in series through the second mentioned dead section with the source of current when the second mentioned vehicle is on said second mentioned dead section.

2. A toy electric railway system having a course of tracks, means supplying propulsion current to said tracks, a first vehicle adapted to receive propulsion current from said tracks and to operate thereon, a bridge in said course of tracks adapted in one position to complete said tracks and to be moved to an open position forming a gap in said tracks, an electric motor adapted to move said bridge from closed to open position, a control means in said tracks effective, when said vehicle passes over said control means, to cause said motor to operate said bridge to open position, a second vehicle, means to operate said second vehicle over a course which passes through said gap, control means for the operating means of each vehicle interrelated so that the first vehicle will pass over the bridge only when said bridge is in closed position and the second vehicle will pass through said gap only when said bridge opens said gap, said interrelated control means including a section of said tracks on the approach side of said bridge which is adapted to be supplied with propulsion current only when said bridge is in closed position and means causing said bridge to be moved to closed position.

3. A toy electric railway system having a course of tracks, means supplying propulsion current to said tracks, a first vehicle adapted to receive propulsion current from said tracks and to operate thereon, a bridge in said course of tracks adapted in one position to complete said tracks and to be moved to an open position forming a gap in said tracks, an electric motor adapted to move said bridge from closed to open position and to return said bridge from open to closed position, a control means in said tracks effective, when said vehicle passes over said control means, to cause said motor to operate said bridge to open position, a second vehicle, means to operate said second vehicle over a course which passes through said gap, control means for the operating means of each vehicle interrelated so that the first vehicle will pass over the bridge only when said bridge is in closed position and the second vehicle will pass through said gap only when said bridge opens said gap, and said interrelated control means including a section of said tracks on the approach side of said bridge which is adapted to be supplied with propulsion current only when said bridge is in closed position.

4. A toy electric railway system having a course of tracks, means supplying propulsion current to said tracks, a toy train adapted to receive propulsion current from said tracks and to operate thereon, a bridge in said course of tracks adapted in one position to complete said tracks and to be moved to an open position forming a gap in said tracks, an electric motor adapted to move said bridge from closed to open position, a control means in said tracks effective, when said train passes over said control means, to cause said motor to operate said bridge to open position, a toy boat having a stop position, means to operate said boat from its stop position over a course which passes through said gap, control means for each of the train and boat operating means interrelated so that the train will pass over the bridge only when said bridge is in closed position and the boat will pass through said gap only when said bridge opens said gap, said interrelated control means including a section of said tracks on the approach side of said bridge which is adapted to be supplied with propulsion current only when said bridge is in closed position and means causing said bridge to be moved to closed position.

5. A toy electric railway system having a course of tracks, means supplying propulsion current to said tracks, a toy train adapted to receive propulsion current from said tracks and to operate thereon, a bridge in said course of tracks adapted in one position to complete said tracks and to be moved to an open position forming a gap in said tracks, an electric motor adapted to move said bridge from closed to open position and to return said bridge from open to closed position, a control means in said tracks effective, when said train passes over said control means, to cause said motor to operate said bridge to open position, a toy boat having a stop position, means to operate said boat from its stop position over a course which passes through said gap, control means for each of the train and boat operating means interrelated so that the train will pass over the bridge only when said bridge is in closed position and the boat will pass through said gap only when said bridge opens said gap, and said interrelated control means including a section of said tracks on the approach side of said bridge which is adapted to be supplied with propulsion current only when said bridge is in closed position.

6. A toy electric railway system having a course of tracks, means supplying propulsion current to said tracks, a first vehicle adapted to receive propulsion current from said tracks and to operate thereon, a bridge in said course of tracks adapted in one position to complete said tracks and to be moved to an open position forming a gap in said tracks, an electric motor adapted to move said bridge from closed to open position, a control section of track included in said course of tracks on the approach side of the bridge effective, when said vehicle passes over said section, to cause said motor to operate said bridge to open position, a second vehicle, means to operate said second vehicle over a course which passes through said gap, control means for the operating means of each vehicle interrelated so that the first vehicle will pass over the bridge only when said bridge is in closed position and the second vehicle will pass through said gap only when said bridge opens said gap, said interrelated control means including a stop section of track also included in said course of tracks on the approach side of said bridge and disposed intermediate said control section and said bridge and which is adapted to be supplied with propulsion current only when said bridge is in closed position, and means causing said bridge to be moved to closed position.

7. A toy electric railway system having a course of tracks, means supplying propulsion current to said tracks, a first vehicle adapted to receive propulsion current from said tracks and to operate thereon, a bridge in said course of tracks adapted in one position to complete said tracks and to be moved to an open position forming a gap in said tracks, an electric motor adapted to move said bridge from closed to open position, and to return said bridge from open to closed position, a control section of track included in said course of tracks on the approach side of the bridge effective, when said vehicle passes over said section, to cause said motor to operate said bridge to open position, a second vehicle, means to operate said second vehicle over a course which passes through said gap, control means for the operating means of each vehicle interrelated so that the first vehicle will pass over the bridge only when said bridge is in closed position and the second vehicle will pass through said gap only when said bridge opens said gap, and said interrelated control means including a stop section of track also included in said course of tracks on the approach side of said bridge and disposed intermediate said control section and said bridge and which is adapted to be supplied with propulsion current only when said bridge is in closed position.

8. A toy electric railway system having a course of tracks, means supplying propulsion current to said tracks, a first vehicle adapted to receive propulsion current from said tracks and to operate thereon, a bridge in said course of tracks adapted in one position to complete said tracks and to be moved to an open position forming a gap in said tracks, an electric motor adapted to move said bridge from closed to open position, normally ineffective control means in said tracks adapted, upon being rendered effective and upon said vehicle passing thereover, to cause said motor to operate said bridge to open position, a second vehicle and means for operating the same over a course which includes said gap, control means for the operating means of each vehicle interrelated so that the first vehicle will pass over the bridge only when said bridge is in closed position and the second vehicle will pass through said gap only when said bridge opens said gap, said interrelated control means including a section of said tracks on the approach side of said bridge which is adapted to be supplied with propulsion current only when said bridge is in closed position, means causing said bridge after operation thereof to open position to be moved to closed position, and manually controlled means for rendering said first control means effective or ineffective.

9. A toy electric railway system having a course of tracks, means supplying propulsion current to said tracks, a first vehicle adapted to receive propulsion current from said tracks and to operate thereon, a bridge in said course of tracks adapted in one position to complete said tracks and to be moved to an open position forming a gap in said tracks, an electric motor adapted to move said bridge from closed to open position and to return said bridge from open to closed position, normally ineffective means in said tracks adapted, upon being rendered effective and upon said vehicle passing thereover, to cause said motor to operate said bridge to open position, a second vehicle and means for operating the same over a course which includes said gap, control means for the operating means of each vehicle interrelated so that the first vehicle will pass over the bridge only when said bridge is in closed position and the second vehicle will pass through said gap only when said bridge opens said gap, said interrelated control means including a section of said tracks on the approach side of said bridge which is adapted to be supplied with propulsion current only when said bridge is in closed position, and manually controlled for rendering said first control means effective or ineffective.

10. In a toy electric railway system having a course of tracks, means to supply propulsion current to the tracks, a first vehicle adapted to receive propulsion current from the tracks and to operate thereon, a bridge in the course of tracks adapted in one position to complete the tracks and to be moved to an open position to form a gap in the tracks, a signal at the approach end of the bridge to indicate the open or closed positions, an electric motor adapted to move the bridge from closed to open position, normally ineffective control means in said tracks adapted, upon being rendered effective and upon the vehicle passing thereover, to cause said motor to operate the bridge to its open position and cause the signal to indicate that the bridge is open, a second vehicle, means to operate said second vehicle over a course which includes said gap, control means for the operating means of each vehicle interrelated so that the first vehicle will pass over the bridge only when the bridge is in closed position and the second vehicle will pass through said gap only when said bridge opens said gap, said interrelated control means including a section of the tracks on the approach side of the bridge which is adapted to be supplied with propulsion current only when said bridge is in closed position, means causing said bridge after operation thereof to open position to be moved to closed position and to cause the signal light to indicate that the bridge is in its closed position, and manually controlled means to render the first mentioned control means effective or ineffective.

11. In a toy railway system having a course of tracks, means to supply propulsion current to the tracks, a toy train adapted to receive propulsion current from the tracks and to operate thereon, a bridge in the course of tracks adapted in one position to complete the tracks and to be moved to an open position forming a gap in the tracks, a signal at the approach end of the bridge to indicate the open or closed position of the bridge, an electric motor adapted to move said bridge from closed to open position, normally ineffective means in said tracks adapted, upon being rendered effective and upon said vehicle passing thereover, to cause said motor to operate said bridge to open position and to cause the signal to indicate the open position of the bridge, a toy boat having a stop position, means to operate said boat from its stop position over a course which passes through said gap, control means for each of the train and boat operating means interrelated so that the train will pass over the bridge only when said bridge is in closed position and the boat will pass through said gap only when said bridge opens said gap, said interrelated control means including a section of said tracks on the approach side of the bridge which is adapted to be supplied with propulsion current only when said bridge is in closed position, means causing said bridge after operation thereof to open position to be moved to closed position and to cause the signal to indicate that the bridge is closed, and manually controlled means to render the first mentioned control means effective or ineffective.

12. In a toy electric railway system having a course of tracks, means to supply propulsion current to the tracks, a toy train adapted to receive propulsion current from the tracks and to operate thereon, a bridge in the course of tracks adapted in one position to complete the tracks and to be moved to an open position forming a gap in the tracks, a signal at the approach end of the bridge to indicate the open or closed position of the bridge, an electric motor adapted to move said bridge from closed to open position and to return said bridge from open to closed position, normally ineffective means in said tracks adapted, upon being rendered effective and upon said vehicle passing thereover, to cause said motor to operate said bridge to open position and to cause the signal to indicate the open position of the bridge, a toy boat having a stop position, means to operate the boat from its stop position over a course which passes through the gap, control means for each of the train and boat operating means interrelated so that the train will pass over the bridge only when said bridge is in its closed position and the boat will pass through the gap only when said bridge opens said gap, said interrelated control means including a section of the tracks on the approach side of the bridge which is adapted to be supplied with propulsion current only when said bridge is in closed position, and manually controlled means to render the first mentioned control means effective or ineffective.

THOMAS L. DUFFY.

CERTIFICATE OF CORRECTION.

Patent No. 2,256,862. September 23, 1941.

THOMAS L. DUFFY.

It is hereby certified that error appears in the printed specification of the above numbered patent requiring correction as follows: Page 3, second column, line 19, for "by" read --my--; page 5, first column, line 3, for the word "warm" read --worm--; page 7, second column, line 28, claim 9, after "controlled" insert --means--; and that the said Letters Patent should be read with this correction therein that the same may conform to the record of the case in the Patent Office.

Signed and sealed this 4th day of November, A. D. 1941.

(Seal)

Henry Van Arsdale,
Acting Commissioner of Patents.